(12) United States Patent
Angood (10) Patent No.: US 11,300,396 B2
(45) Date of Patent: Apr. 12, 2022

(54) COORDINATE POSITIONING MACHINE

(71) Applicant: RENISHAW PLC, Wotton-under-Edge (GB)

(72) Inventor: Stephen Mark Angood, Portreath (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/066,054

(22) Filed: Oct. 8, 2020

(65) Prior Publication Data

US 2021/0033376 A1 Feb. 4, 2021

Related U.S. Application Data

(63) Continuation of application No. 16/092,430, filed as application No. PCT/GB2017/050909 on Mar. 31, 2017, now Pat. No. 10,830,567.

(30) Foreign Application Priority Data

Apr. 8, 2016 (EP) ..................................... 16164457
Apr. 25, 2016 (GB) ..................................... 1607120

(51) Int. Cl.
  *G01B 5/008* (2006.01)
  *G01B 5/00* (2006.01)
  (Continued)

(52) U.S. Cl.
  CPC .......... *G01B 5/0004* (2013.01); *B25J 9/0012* (2013.01); *B25J 9/0066* (2013.01); *B25J 9/123* (2013.01);
  (Continued)

(58) Field of Classification Search
  CPC ............................... G01B 5/0004; B25J 9/123
  (Continued)

(56) References Cited

U.S. PATENT DOCUMENTS 4,976,582 A   12/1990   Clavel
5,149,996 A    9/1992   Preston et al.
(Continued)

FOREIGN PATENT DOCUMENTS

CA     2 406 622 A1   11/2001
CN       1418366 A     5/2003
(Continued)

OTHER PUBLICATIONS

Baradat, C. et al . "Design and Prototyping of a New Balancing Mechanism for Spatial Parallel Manipulators," XP 9123750 Journal of Mechanical Design, vol. 130, No. 7, Jul. 1, 2008, pp. 72305-1 to 72305-13.
(Continued)

*Primary Examiner* — George B Bennett
(74) *Attorney, Agent, or Firm* — Oliff PLC (57) ABSTRACT

A non-Cartesian coordinate positioning machine that includes an extendable leg assembly for positioning a component such as a measurement probe within a working volume of the machine. The extendable leg assembly includes a first member and a second member which move relative to one another when the extendable leg assembly changes length. The first member including an axial arrangement of magnets forming part of a linear motor for extending and retracting the extendable leg assembly, and at least one resilient member for absorbing at least some of any axial thermal expansion or contraction of the magnets in use.

20 Claims, 10 Drawing Sheets

(51) Int. Cl.
*B25J 9/00* (2006.01)
*B25J 9/12* (2006.01)
*B25J 19/00* (2006.01)

(52) U.S. Cl.
CPC ........ *B25J 19/0016* (2013.01); *G01B 5/0002* (2013.01); *G01B 5/0014* (2013.01); *G01B 5/0016* (2013.01)

(58) Field of Classification Search
USPC .......................................................... 33/503
See application file for complete search history.

(56) References Cited

U.S. PATENT DOCUMENTS

| | | | |
|---|---|---|---|
| 5,314,397 | A | 5/1994 | Mills et al. |
| 5,604,593 | A | 2/1997 | McMurtry |
| 5,743,020 | A * | 4/1998 | Sheldon ................. G01B 5/012 33/559 |
| 5,797,191 | A | 8/1998 | Ziegert |
| 5,836,082 | A | 11/1998 | Sheldon |
| 5,870,834 | A | 2/1999 | Sheldon |
| 5,887,356 | A * | 3/1999 | Sheldon ................. G01B 7/012 33/556 |
| 5,909,939 | A | 6/1999 | Fugmann |
| 6,330,837 | B1 | 12/2001 | Charles et al. |
| 7,503,125 | B2 | 3/2009 | Jordil et al. |
| 7,707,737 | B2 * | 5/2010 | Lightfoot ................. G01B 3/08 33/700 |
| 7,810,248 | B2 * | 10/2010 | McMurtry ............. G01B 5/008 33/503 |
| 10,816,335 | B2 * | 10/2020 | McMurtry ........... G01B 5/0016 |
| 2001/0026204 | A1 | 10/2001 | Petro |
| 2003/0005786 | A1 | 1/2003 | Stuart et al. |
| 2003/0070311 | A1 | 4/2003 | Zhu et al. |
| 2004/0167654 | A1 | 8/2004 | Grimm et al. |
| 2009/0101769 | A1 | 4/2009 | Duchemin et al. |
| 2009/0133276 | A1 | 5/2009 | Bailey |
| 2009/0260243 | A1 | 10/2009 | Evans et al. |
| 2010/0058602 | A1 | 3/2010 | McMurtry |
| 2010/0122602 | A1 | 5/2010 | Marcroft et al. |
| 2013/0061710 | A1 | 3/2013 | Long |
| 2016/0238190 | A1 | 8/2016 | Schyttberg |
| 2018/0209788 | A1 | 7/2018 | McMurtry et al. |
| 2019/0145748 | A1 * | 5/2019 | Angood ............... G01B 5/0004 33/503 |

FOREIGN PATENT DOCUMENTS

| | | |
|---|---|---|
| CN | 1592050 A | 3/2005 |
| CN | 101151786 A | 3/2008 |
| CN | 101298984 A | 11/2008 |
| CN | 101427448 A | 5/2009 |
| CN | 101939897 A | 1/2011 |
| CN | 102437706 A | 5/2012 |
| EP | 0250470 B1 | 7/1991 |
| EP | 1585903 A1 | 10/2005 |
| JP | H05-500337 A | 1/1993 |
| JP | H05-040968 U | 6/1993 |
| JP | H06-155203 A | 6/1994 |
| JP | H07-006707 U | 1/1995 |
| JP | 2005-58351 A | 3/2005 |
| JP | 2005-536703 A | 12/2005 |
| JP | 2007-312501 A | 11/2007 |
| WO | 91/03145 A1 | 3/1991 |
| WO | 92/17313 A2 | 10/1992 |
| WO | 95/14905 A1 | 6/1995 |
| WO | 95/20747 A1 | 8/1995 |
| WO | 03/006837 A1 | 1/2003 |
| WO | 2004/063579 A1 | 7/2004 |
| WO | 2007/144573 A1 | 12/2007 |
| WO | 2007/144585 A2 | 12/2007 |
| WO | 2007/144587 A1 | 12/2007 |
| WO | 2007/144602 A1 | 12/2007 |
| WO | 2007/144603 A2 | 12/2007 |
| WO | 2017/021733 A1 | 2/2017 |

OTHER PUBLICATIONS

Chamberlain, J., "The difference between linear motors and linear mechanical devices," Machine Design, Nippon Pulse American Inc., 2011, [http://machinedesign.com/linearmotion/differencebetweenlinearmotorsandlinearmechanicaldevices].

Chamberlain, J., "Using linear-shaft motors in parallel," Machine Design, Nippon Pulse American Inc., 2011, [http://machinedesign.com/motorsdrives/usinglinearshaftmotorsparallel].

Sep. 6, 2016 Search Report issued in British Patent Application No. 1607120.1.

Jun. 23, 2017 International Search Report issued in International Patent Application No. PCT/GB2017/050909.

Jun. 23, 2017 Written Opinion of the International Searching Authority issued in International Patent Application No. PCT/GB2017/050909.

* cited by examiner

COORDINATE POSITIONING MACHINE

This application is a continuation of U.S. patent application Ser. No. 16/092,430, filed Oct. 9, 2018, which is national stage application of PCT/GB2017/050909, filed Mar. 31, 2017, which in turn claims priority to British Patent Application No. GB1607120.1, filed Apr. 25, 2016, and European Patent Application No. EP16164457.0, filed Apr. 8, 2016. The contents of these prior applications are incorporated by reference herein in their entirety.

The present invention relates to a coordinate positioning machine, and in particular to a non-Cartesian coordinate positioning machine such as a hexapod coordinate positioning machine. Coordinate positioning machines include, for example, coordinate measuring machines (CMMs) and machine tools.

Figure 1:
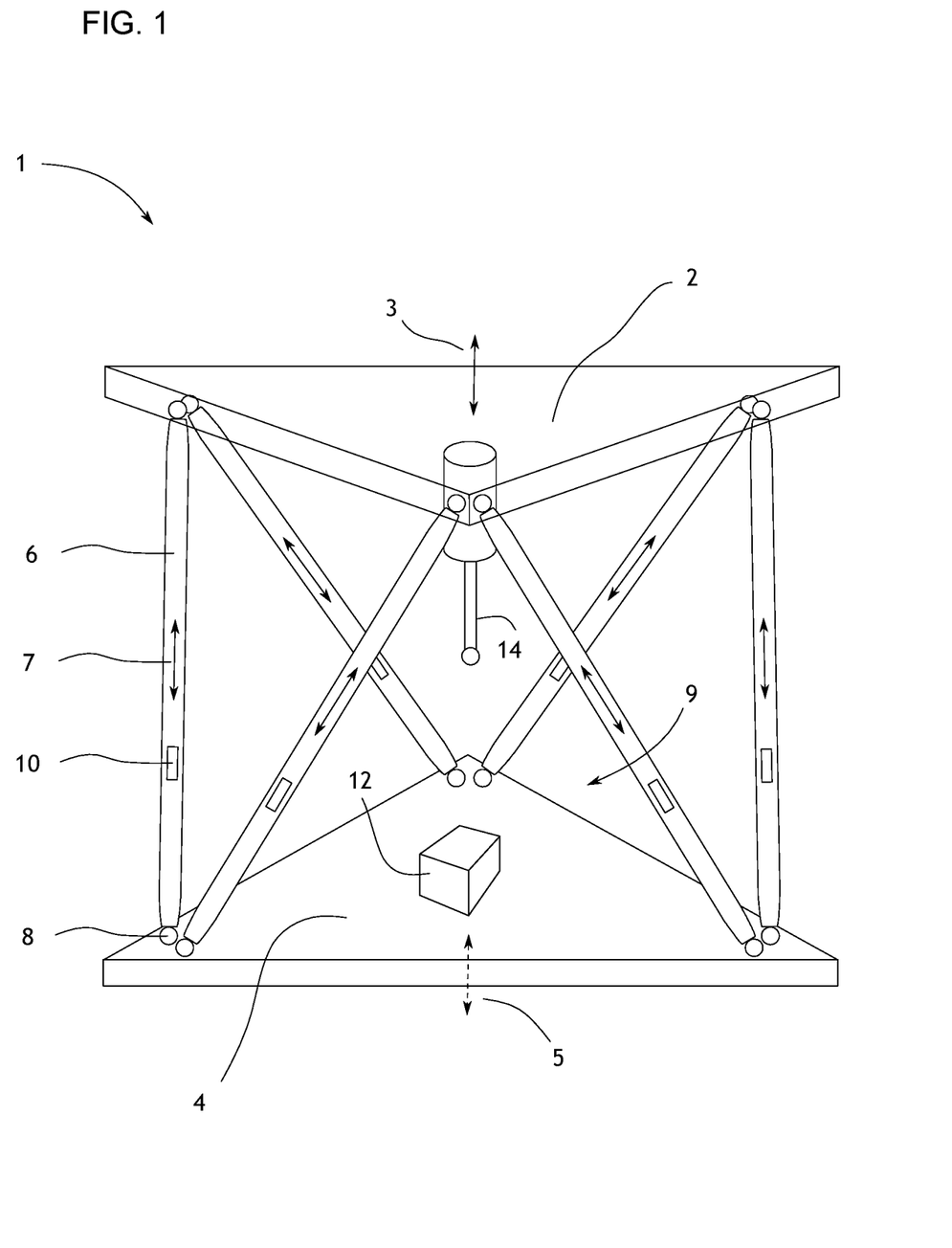
FIG. 1, discussed hereinbefore, is schematic illustration of a hexapod non-Cartesian coordinate positioning machine, having six extendable legs.

As illustrated schematically in FIG. 1 of the accompanying drawings, a non-Cartesian coordinate positioning machine 1 generally comprises first and second stages or platforms 2, 4 that are supported and moved relative to each other by a plurality of telescopic or extendable legs 6 provided between them. The extendable legs 6 are sometimes also referred to as struts or rams, and where there are six such extendable legs 6 (as illustrated in FIG. 1), the machine is commonly called a hexapod.

The extendable legs 6 are typically mounted on the platforms 2, 4 via ball joints 8, with each leg 6 either having its own ball joint 8 at one or both ends thereof (as illustrated in FIG. 1), or sharing a ball joint 8 with an adjacent leg 6 at one or both ends.

Various relative positions and orientations between the first and second platforms 2, 4 can be achieved by extending the legs 6 by differing amounts, as illustrated in FIG. 1 by arrows 7. The relative position and orientation at any instant is monitored by a plurality of length-measuring transducers 10, for example with one transducer being associated with each extendable leg 6. The length-measuring transducer may comprise an encoder scale paired with a readhead.

One of the platforms 2, 4 is typically provided as part of a fixed structure of the positioning machine 1, with the other of the platforms 4, 2 moving 5, 3 relative to the fixed structure. A component (for example a probe or a tool) can be mounted on the moving platform and a workpiece mounted to the fixed structure, or vice versa, to enable an operation to be performed on the workpiece (for example measuring, probing, or scanning in the case of a coordinate measuring machine, or machining in the case of a machine tool).

For example, as illustrated in FIG. 1, the lower platform 4 is fixed and the upper platform 2 is moveable, with a workpiece 12 mounted on the lower platform 4 and a probe component 14 mounted on the upper platform 2. A working volume 9 is defined between the upper platform 2 and the lower platform 4, with the probe component 14 being positioned in the working volume 9 by operation of the extendible legs 6. Although a vertical arrow 3 is shown to indicate movement, with appropriate control of the various legs 6 the platform 2 will of course also be moveable horizontally and could also be tiltable.

Alternatively, the upper platform 2 could be fixed and the lower platform 4 moveable, with a probe mounted to a lower surface of the lower platform 4 and a workpiece mounted to a part of the fixed structure below that, so that the working volume (or operating volume) of the machine is below the lower platform 4 rather than between the upper and lower platforms 2, 4.

Various types of non-Cartesian coordinate positioning machine are described in more detail in WO 91/03145, WO 95/14905, WO 95/20747, WO 92/17313, WO 03/006837, WO 2004/063579, WO 2007/144603, WO 2007/144573, WO 2007/144585, WO 2007/144602 and WO 2007/144587.

For example, WO 91/03145 describes a hexapod machine tool comprising an upper, moveable, platform that is attached to a base by six hydraulic extendable legs, similar in principle to that illustrated in FIG. 1 described above. The extendable legs are attached to the base and moveable platform via ball joints. The extendable legs are hydraulic and comprise a piston rod that is moveable within a cylinder. The amount of leg extension is measured by mounting a magnetic scale to the cylinder and a suitable readhead on the piston rod. Extension of the leg thus causes the scale to move past the readhead thereby allowing the length of the leg to be measured. A computer controller acts to set the length of each leg to provide the required platform movement.

As with any metrology apparatus, positional accuracy and repeatability are important, and various schemes have previously been proposed in order to improve positional accuracy and repeatability in a non-Cartesian coordinate positioning machine.

For example, WO 2007/144573 recognises that load forces that occur in the apparatus during use may introduce distortions into metrology elements of the apparatus, thereby leading to positional inaccuracies. Therefore, WO 2007/144573 describes an improvement to WO 91/03145, in which a position measurement apparatus is provided with a metrology frame that is separate from the thrust (or load-bearing) frame. Any load forces that may occur in the load-bearing structure are thereby not passed through to the metrology structure, thus preventing any substantial distortion of the metrology frame and thereby ensuring measurement accuracy is not degraded. The separation of the load-bearing structure from the metrology structure applies to each of the six extendable legs, with each leg being provided with have a load-bearing outer structure and a metrology inner structure, with the metrology structure of the legs being mechanically isolated from the load-bearing structure. This is apparent particularly from FIG. 3 of WO 2007/144573.

WO 95/14905 describes a variant of the above described hexapod apparatus in which the length of each extendable leg is measured interferometrically.

According to a first aspect of the present invention, there is provided a non-Cartesian coordinate positioning machine comprising an extendable leg assembly for positioning a component within a working volume of the machine, the extendable leg assembly comprising first and second members which move relative to one another when the extendable leg assembly changes length, the first member comprising an axial arrangement of magnets forming part of a linear motor for extending and retracting the extendable leg assembly, and at least one resilient member for absorbing (arranged to absorb) at least some of any axial thermal expansion or contraction of the magnets in use.

Drive motors used in a non-Cartesian coordinate positioning machine to extend and retract the extendable legs generate heat in use. If the heat so generated is not properly dealt with, there is a risk that it will cause thermal expansion (and subsequent contraction) of the metrology structure, which in turn will have an adverse effect on the metrology results. This is particularly the case where the drive motor is close to or even forms part of the metrology structure.

For example, in an embodiment of the present invention the extendable leg assembly forms part of the metrology structure and an arrangement of magnets that forms part of a linear motor for extending and retracting the extendable leg assembly is provided within the extendable leg assembly itself. A linear motor can be considered to a motor in which a movable part moves in a substantially straight line (i.e. linearly). The use of a resilient member in association with or as part of the arrangement of magnets allows at least some of any thermal expansion or contraction of the magnets to be absorbed by the resilient member, without affecting the length of the extendable leg assembly. This has the effect of improving metrology results from the non-Cartesian coordinate positioning machine.

The magnets and the at least one resilient member may be arranged axially between first and second stops of the first member. At least one of the first and second stops may be, or may be at, or may be near, or may form, an end of the first member. The magnets may be arranged internally along at least part of a length of the first member. The at least one resilient member may be considered to be, or provided as part of, the axial arrangement; the axial arrangement is thereby an axial arrangement of elements, where the elements comprise the magnets and the at least one resilient member.

The at least one resilient member may comprise a spring. The at least one resilient member may comprise a resilient material. The resilient material may comprise a silicone material. The resilient material may be non-magnetic. The resilient material may be non-conductive. The resilient material may comprise a low-viscosity silicone material. The resilient material may be provided between at least some of the magnets and/or between at least one of the magnets and an inner wall of the first member.

The machine may comprise at least one non-magnetic spacer arranged axially between at least one respective pair of magnets of the linear motor, effectively as part of the arrangement of magnets. The at least one non-magnetic spacer may be considered to be, or provided as part of, the axial arrangement; the axial arrangement is thereby an axial arrangement of elements, where the elements comprise the magnets and the at least one non-magnetic spacer.

The first and/or second member (for example a tube of the first and/or second member) may be formed from a composite material. The composite material may comprise a graphite composite material. The composite material may comprise a carbon fibre material.

The first and second members may be elongate in nature. The machine may comprise a plurality of such extendable leg assemblies, for example six.

The machine may be a coordinate measuring machine. The machine may be a comparator.

The coordinate positioning machine may comprise, for example as part of the extendable leg assembly itself, a metrology component for measuring a separation between ends of the extendable leg assembly, or some other length associated with the extendable leg assembly. One such example of a metrology component is an encoder scale.

The machine may comprise a metrology component for measuring a length associated with the extendable leg assembly. The length associated with the extendable leg assembly may be or relate to a separation between ends of the extendable leg assembly. The metrology component may comprise an encoder scale. The metrology component may be affixed to the first member. The metrology component may be affixed on an outer side of the first member, with the axial arrangement of magnets being arranged within the first member.

The first member may be provided in the form of a tube.

The linear motor may be a linear shaft motor. The magnets may be permanent magnets.

The first and second members may move linearly relative to one another when the extendable leg assembly changes length. For example, the first and second members may slide over or past one another, for example telescopically. The first and second members may together form an elongate member of the extendable leg assembly.

The extendable leg assembly may be supported (or held) in the machine by at least one support, such as at an end (or joint) of the extendable leg assembly. The extendable leg assembly may be provided between first and second platforms of the machine, with the first and second platforms being positioned relative to each other by the extendable leg assembly. The component may be attached to one of the first and second platforms. One of the first and second platforms may be fixed (stationary), with the component being attached to the other of the first and second platforms. The term platform is a broad term to describe any type of structure, and is not intended to imply any limitations as to form and shape.

The machine may comprise a counterbalance arrangement for supporting at least some of a weight that would otherwise be supported by the linear motor. The counterbalance arrangement may support at least part of a weight of the first or second platforms mentioned above, for example the non-stationary platform.

It is to be appreciated that, where it is described herein that the component is moved to a particular position in the working volume, this could be by way of drive means provided by the coordinate positioning machine, for example as part of or at least associated with the extendible leg assembly itself, or this could be by way of some external influence, for example manual positioning of the component by an operator.

Also, where it is described that the extendable leg assembly is for positioning the component within the working volume, this is to be understood as meaning either setting the position of the component within the working volume (by actively moving the component to that position) or determining the position of the component within the working volume (the component having been moved to that position by whatever means), or a combination of these. In either case, positioning the component within the working volume is associated with moving the component around the working volume, and is not intended to cover merely determining the position of a static component (e.g. a workpiece) placed within the working volume.

The component may be attached directly or indirectly to and/or move with an end of the extendable leg assembly, so that the component can be moved around the working volume by operation of the extendable leg assembly. The component may be a measurement probe, or a part thereof (such as a stylus or a stylus tip). The component may be a tool, or a part thereof, such as a tool typically found in a machine tool for shaping or machining metal or other rigid materials. The component can even be considered to be a part, for example a moveable end, of the extendable leg assembly itself, for example defined by a ball joint at that end.

Furthermore, the term 'working volume' is intended to mean only that part of the working volume over which the present invention has effect. The term 'working volume' is to be construed accordingly, and should be read as 'at least part of the working volume' where appropriate.

The component that is being positioned within the working volume of the machine may comprise a metrology component or metrology instrument, such as a measurement probe.

According to a second aspect of the present invention, there is provided a linear actuator comprising first and second members which move relative to one another when the linear actuator changes length, the first member comprising an axial arrangement of magnets forming part of a linear motor for extending and retracting the linear actuator, and at least one resilient member for absorbing (arranged to absorb) at least some of any axial thermal expansion or contraction of the magnets in use. The linear actuator may be used as or as part of an extendable leg assembly for positioning a component within a working volume of a non-Cartesian coordinate positioning machine.

According to a third aspect of the present invention, there is provided a non-Cartesian coordinate positioning machine comprising an extendable leg assembly for positioning a component within a working volume of the machine, the extendable leg assembly comprising first and second members which move relative to one another when the extendable leg assembly changes length, wherein the first and/or second member is formed from a composite material. The composite material may comprise a graphite composite material. The composite material may comprise a carbon fibre material. The first member may comprise an axial arrangement of magnets forming part of a linear motor for extending and retracting the extendable leg assembly. A resilient member may be provided for absorbing at least some of any axial thermal expansion or contraction of the magnets in use.

According to a fourth aspect of the present invention, there is provided a non-Cartesian coordinate positioning machine comprising an extendable leg assembly for positioning a component within a working volume of the machine, the extendable leg assembly comprising first and second members which move relative to one another when the extendable leg assembly changes length, a linear motor arrangement for extending and retracting the extendable leg assembly, and a counterbalance arrangement for supporting at least some of the weight that would otherwise be supported by the linear motor arrangement. The first member may comprise an axial arrangement of magnets forming part of the linear motor arrangement. A resilient member may be provided for absorbing at least some of any axial thermal expansion or contraction of the magnets in use.

According to a further aspect of the present invention, there is provided a non-Cartesian coordinate positioning machine comprising an extendable leg assembly for positioning a component within a working volume of the machine, the extendable leg assembly being supported in the machine by at least one support, and a retaining element for biasing the extendable leg assembly into engagement with the support. The retaining element may comprise a spring member.

According to a further aspect of the present invention, there is provided a non-Cartesian coordinate positioning machine comprising an extendable leg assembly for positioning a component within a working volume of the machine, the extendable leg assembly being supported in the machine by at least one support, the support comprising a retaining element which cooperates with a retaining element on the extendable leg assembly to prevent complete axial disengagement of the extendable leg assembly from the support whilst allowing disengagement of the extendable leg assembly from the support by a small axial movement followed by a substantially radial (or non-axial or sideways) movement.

According to a further aspect of the present invention, there is provided a non-Cartesian coordinate positioning machine comprising an extendable leg assembly for positioning a component within a working volume of the machine, the extendable leg assembly comprising first and second members which move relative to one another when the extendable leg assembly changes length, the first member comprising an arrangement of magnets forming part of a linear motor for extending and retracting the extendable leg assembly, and at least one resilient member for absorbing (arranged to absorb) at least some of any thermal expansion or contraction of the magnets in use. The magnets may be arranged axially, and the at least one resilient member may be arranged to absorb at least some of any axial thermal expansion or contraction of the magnets in use.

According to further aspects of the present invention, for each of the above-mentioned aspects of the present invention there is provided an extendable leg assembly for use in a coordinate positioning machine according the aspect concerned.

Reference will now be made, by way of example, to the accompanying drawings, in which.

Figure 2:
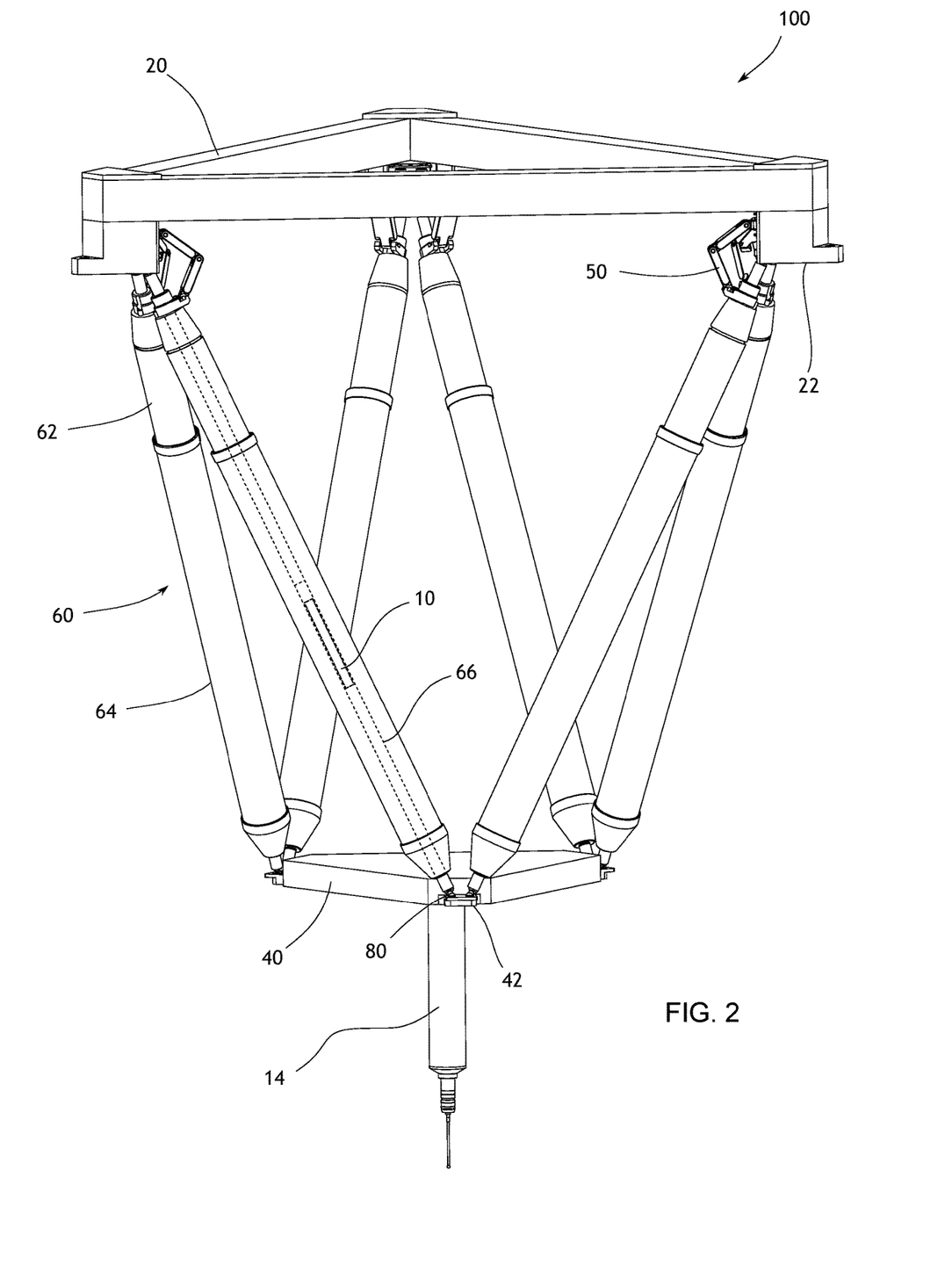
FIG. 2 is an overall view of a non-Cartesian coordinate positioning machine comprising extendable leg assemblies according to an embodiment of the present invention.

FIG. 2 provides an overall view of a non-Cartesian coordinate positioning machine 100 embodying the present invention. The non-Cartesian coordinate positioning machine 100 is similar in principle to that described above with reference to FIG. 1. The non-Cartesian coordinate positioning machine 100 illustrated in FIG. 2 comprises six extendable leg assemblies 60, generally of the same construction, arranged between an upper platform 20 and a lower platform 40. Each of the six extendable leg assemblies 60 comprises an upper tube 62 and a lower tube 64, with the upper tube 62 sliding telescopically within the lower tube 64.

With the particular example illustrated in FIG. 2, the upper platform 20 is fixed and the lower platform 40 is moveable relative to the upper platform by operation of the six extendable leg assemblies 60, with a probe 14 being mounted to a lower surface of the lower platform 40. In this configuration, a workpiece (not illustrated) would be mounted to a part of the fixed structure of the machine 100 below the lower platform 40, so that the working volume of the machine 100 is below the lower platform 40 rather than between the upper and lower platforms 20, 40.

As with the machine of FIG. 1, the extendable leg assemblies 60 are for positioning a component (in the example illustrated in FIG. 2, the component is the probe 14, or at least part a specific part of the probe 14 such as the tip of the probe 14) within the working volume of the machine. Constraint members 50 associated respectively with the extendable leg assemblies 60 prevent (or at least reduce) undesired rotation of the extendable leg assemblies 60 about their respective longitudinal axes.

Upper and lowers ends of each extendable leg assembly 60 are connected respectively to the upper platform 20 and lower platform 40 via individual ball joints 80. The lower ball joints 80 for the front-most two of the extendable leg assemblies 60 are just visible in FIG. 2, and shown in more detail in FIG. 3. The lower ball joints 80 are supported by support blocks 42 of the lower platform 40, while the upper platform 20 is supported on the upper ball joints 80 via support blocks 22 of the upper platform 20; the connection between the upper platform 20 and the extendable leg assemblies 60 is illustrated in more detail in FIG. 4.

The upper and lower tubes 62, 64 of each extendable leg assembly 60 enclose an elongate member 66, shown in dotted outline in one of the extendable leg assemblies of FIG. 2, with an encoder scale 10 affixed to the elongate member 66. The elongate member 66 is itself extendable, for example by way of a telescopic arrangement. Each elongate member 66 extends from its upper joint 80 to its lower joint 80, and it is the respective lengths of the elongate members 66 that determine the precise positioning and orientation of the lower platform 40 (and therefore the probe 14). It is therefore the length of the elongate members 66 that must be measured precisely during a measuring or scanning operation on a workpiece in order to determine the precise location of the tip of the stylus when it is contact with the workpiece surface. Operation of an extendible elongate member 66 is described in more detail below with reference to FIG. 5.

Figure 3:
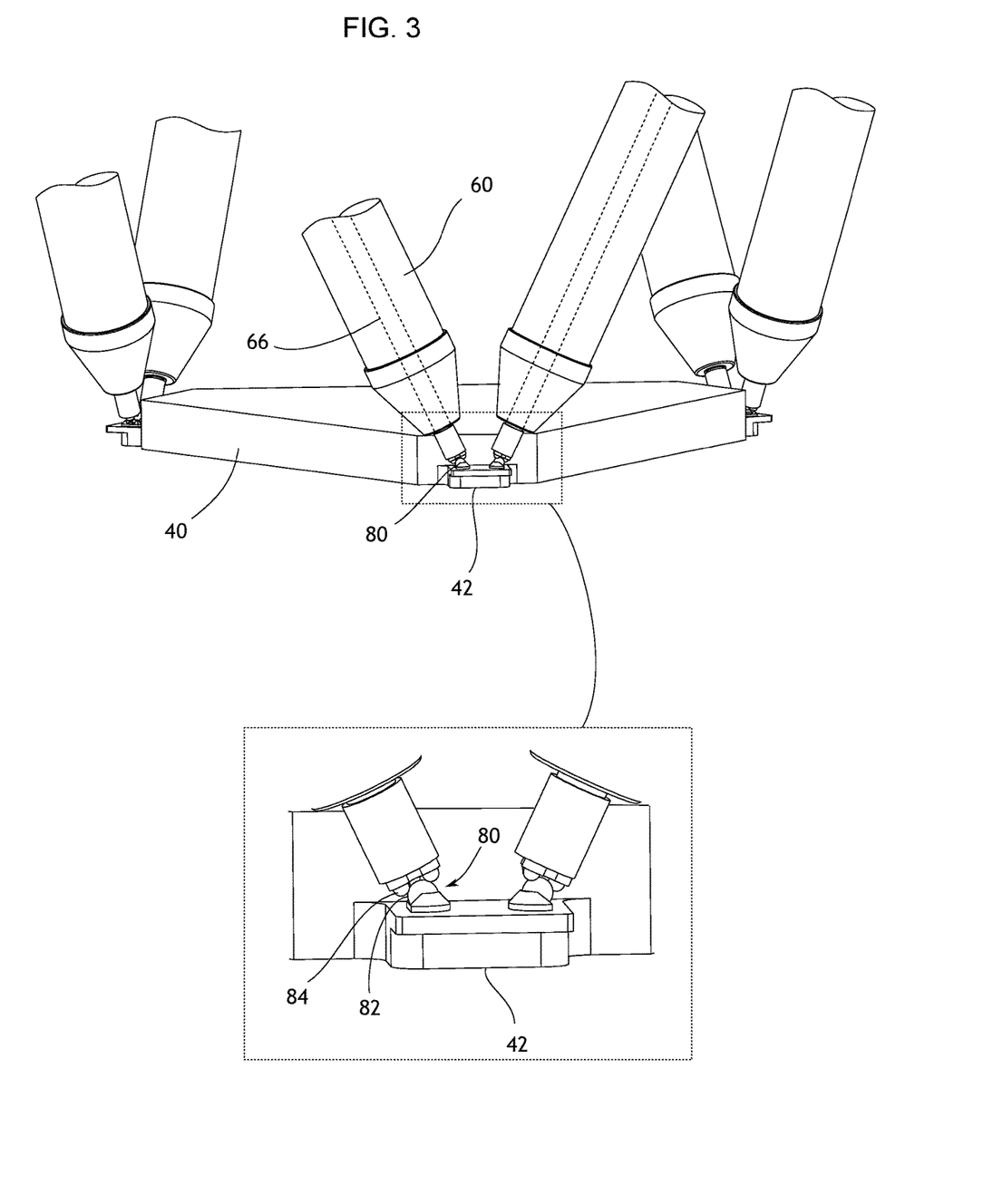
FIG. 3 is a close-up view of part of the machine of FIG. 2, showing in more detail the connection between the extendable leg assemblies and the lower platform of the machine.

FIG. 3 is a close-up view showing the connection between the extendable leg assemblies 60 and the lower platform 40 in more detail. As is shown particularly in the zoomed view to the bottom of FIG. 3, three balls 84 are provided in a triangular arrangement at the lower end of the elongate member 66, with the plane of the triangular arrangement being substantially perpendicular to the longitudinal axis of the elongate member 66. The support block 42 is provided with a larger, fixed, ball 82 which acts to support the three balls 84 on the end of the elongate member 66, with the larger ball 82 nestling within the smaller balls 84.

At the upper end, each extendable leg assembly 60 is provided (or associated) with a constraint member 50, which is attached to the elongate member 66 of the extendable leg assembly 60 and to a further member (the support block 22) provided on the upper platform 20. The constraint member 50 effectively 'ties' the elongate member 66 to the upper platform 20 in order to prevent (or at least reduce) undesired rotation of the elongate member 66 about its longitudinal axis.

Figure 4:
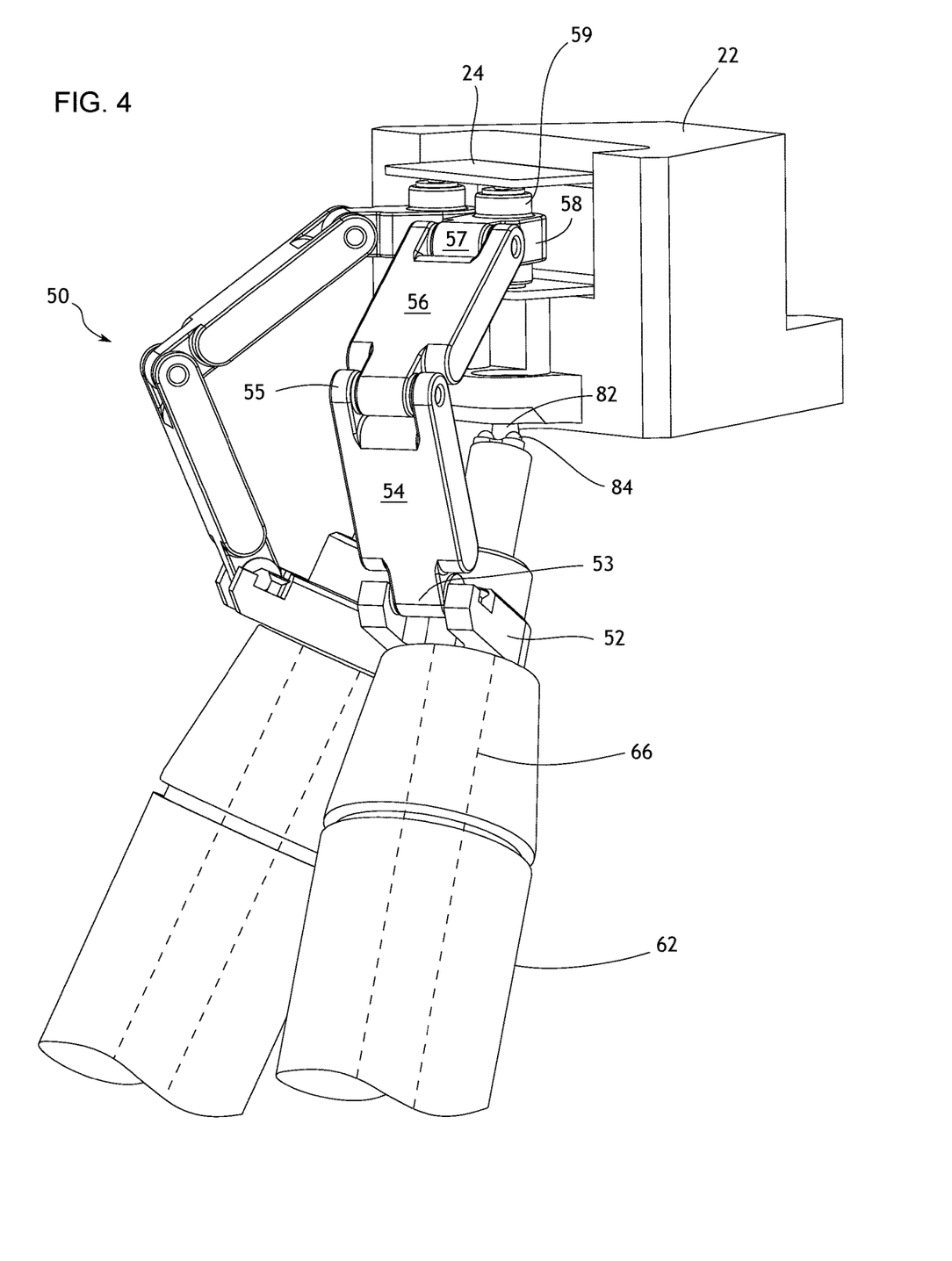
FIG. 4 is a close-up view of part of the machine of FIG. 2, showing the connection between the extendable leg assemblies and the upper platform of the machine, and in particular showing constraint members associated with two of the extendable leg assemblies.

FIG. 4 is a close-up view showing in more detail the connection between the extendable leg assemblies 60 and the upper platform 20 of the machine 100, and in particular showing in more detail the constraint members 50 associated with two of the extendable leg assemblies 60 of FIG. 2. The constraint member 50 can generally be described as a multi-part or multi-section hinge. The illustrated example comprises four parts or sections 52, 54, 56 and 58 connected by rotary joints or knuckles 53, 55 and 57 having substantially parallel axes of rotation. The joints 53, 55 and 57 may be of a standard pin and bearing construction, and may use ball bearings in order to reduce the effect of friction. The purpose, construction and operation of the constraint member 50 is described in more detail in co-pending UK Patent Application No. 1513850.6.

The linear motor (or linear actuator) used to extend and retract the extendible leg assemblies 60 will now be described in more detail with reference to FIGS. 5, 6 and 8.

FIG. 5 is a schematic illustration showing the elongate member 66 of one of the extendible leg assemblies 60. The elongate member 66 comprises first and second elongate members 63 and 65 which move relative to one another when the extendable leg assembly 60 changes length. The first and second elongate members 63, 65 have their respective longitudinal axes arranged substantially in line with one another, and slide over or past one another as the extendable leg assembly 60 extends and retracts. In the example shown in FIG. 5, the first elongate member 63 slides telescopically inside the second member 65. For brevity, the first and second elongate members 63, 65 will be referred to as the first and second members respectively 63, 65.

The first member 63 comprises a plurality of magnets 72 arranged internally along at least part of its length, the plurality of magnets 72 forming part of a linear motor 70 for extending and retracting the extendable leg assembly 60. A linear motor of this type is sometimes referred to as a linear shaft motor. In the example illustrated, the N-S orientation of the magnets alternates along the series of magnets 72, with the N or S pole of one magnet 72 facing the N or S pole respectively of the adjacent magnet 72 in the series, though other arrangements are possible.

A coil 74 is provided on the second member 65, to form the other part of the linear motor. The coil 74 is sometimes referred to as a forcer, and in this example is illustrated as a three-phase coil with the three phases represented by U, V and W. Linear shaft motors of this type are well known, and a detailed explanation of how the coils for the three phases U, V and W relate positionally to the N and S poles of the magnets 72, and detail of how the three phases U, V and W are controlled to actuate the motor, is therefore not required here.

Figure 5A:
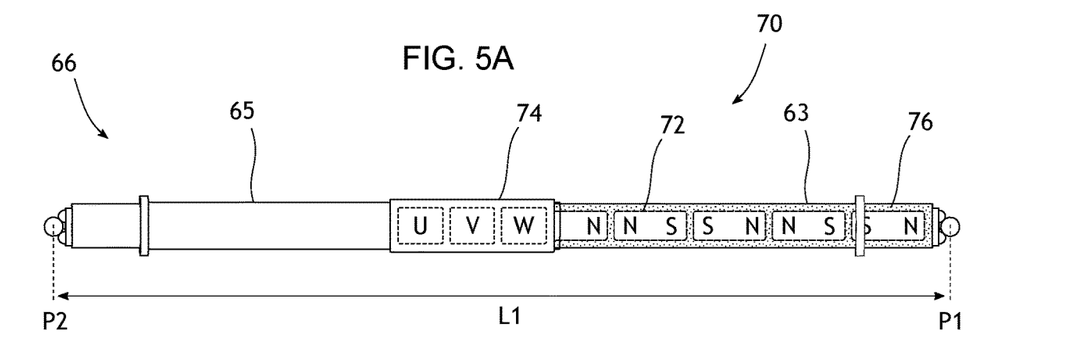
FIGS. 5A to 5C are schematic illustrations of an elongate member of the extendible leg assembly, showing a linear motor (or linear actuator) arrangement according to an embodiment of the present invention.
Figure 5B:
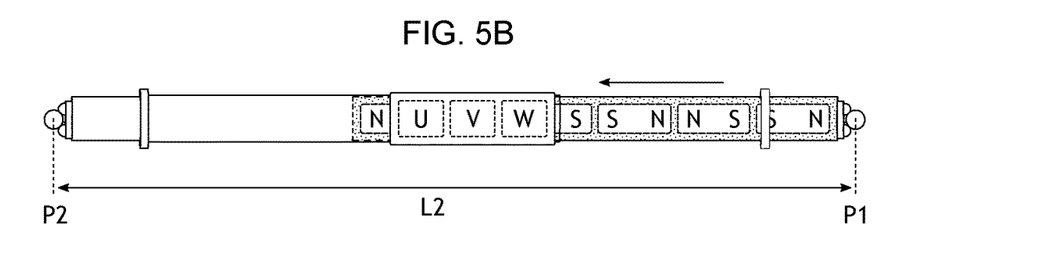
Figure 5C:
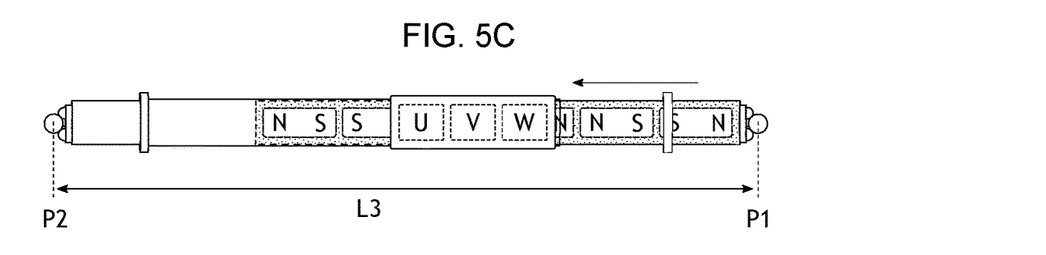

FIGS. 5A, 5B and 5C show the extendible leg assembly 60 with three different respective extensions L1, L2 and L3, for three corresponding positions of the probe component 14 in the working volume.

In FIG. 5A, the extendible leg assembly 60 is fully extended, or at least as fully extended as the linear motor 70 will allow. In FIG. 5B, the extendable leg assembly 60 is retracted somewhat, with the coil 74 having been controlled to generate a magnetic field that interacts with the magnets 72 to produce a force that moves the first member 63 relative to the second member 65, so that the first member 63 retracts further inside the second member 65, shortening the overall length of the extendible leg assembly 60. In FIG. 5C, the extendible leg assembly 60 is retracted even further.

Figures 6, 7:
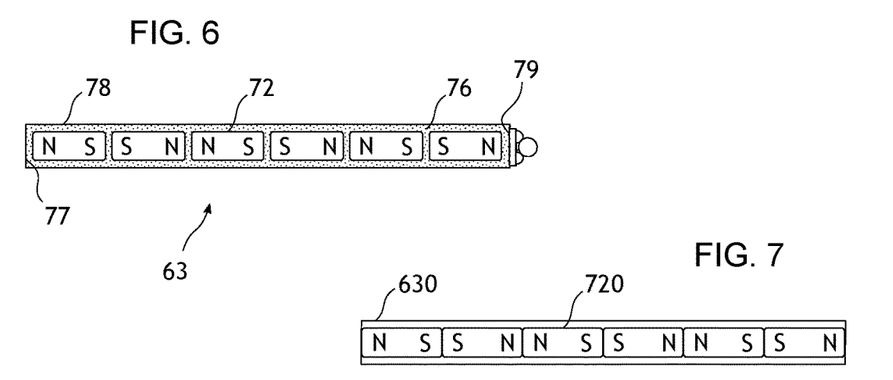
FIG. 6 is a schematic illustration of just the first member of the extendible leg assembly shown in FIGS. 5A to 5C.
FIG. 7 schematically shows an arrangement of magnets inside a member of a linear shaft motor not comprising a resilient member according to an embodiment of the present invention.

FIG. 6 illustrates the first member 63 in isolation, without interference from the second member 65, and therefore shows more clearly the arrangement of the magnets 72 inside the first member 63. The first member 63 is in the form of a hollow tube 78, of any suitable cross section (for example, square or circular). As can be seen, the magnets 72 extend substantially from a first end 77 of the first member 63 to the other (a second) end 79, which is advantageous in maximising the range of relative movement between the first and second members 63 and 65, and therefore the range of extension and contraction of the extendible leg assembly 60.

To provide a key benefit of the present invention, in this embodiment a resilient material 76 is provided around the magnets 72, i.e. between the magnets 72 and also between the stack of magnets 72 and the ends 77, 79 of the first member 63. Ordinarily, the presence of such resilient (or flexible or compliant) material 76 would not be required or even contemplated by the skilled person in a linear actuator. For example, FIG. 7 schematically shows how a member 630 of a linear shaft motor (not embodying the first aspect of the present invention) would ordinarily be constructed, with magnets 720 extending from end to end without any gaps or "wasted" space.

However, when using a linear actuator member 630 such as that shown in FIG. 7 in the context of a non-Cartesian coordinate positioning machine, the present applicant found that very small measurement inaccuracies (which, although small, are significant in a high-precision metrology context) could be attributed to the design of the actuator member, and in particular to the arrangement of magnets therein. The present applicant determined that these metrology errors were being caused by thermal expansion and contraction of the magnets inside the actuator member, which in turn led to small changes in the length of the actuator member, and hence to metrology errors as a result. Ordinarily such effects would be of no consequence in a linear motor, since the function of the linear motor would be unaffected, but in a metrology context the effect is significant. The problem is exacerbated because of the heat generated in the linear motor coils, which are in close proximity to the magnets.

The present applicant has overcome this problem, which is very specific to a metrology context, by the use of a resilient material (as illustrated in FIGS. 5 and 6) to absorb at least some of any thermal expansion or contraction of the magnets in use. This has been found to produce a significant improvement in metrology results. In the embodiment illustrated in FIG. 6, the magnets effectively "float" inside the first member 63, though there is sufficient mechanical rigidity in the resilient material 63 that the electromagnetic forces acting on the magnets 72 due to the action of the coil 74 are transferred to the housing of the first member 63 to move it (rather than just the magnets 72) relative to the second member 65.

It will be appreciated that the invention is not limited to the arrangement shown in FIG. 6, in which the linear motor magnets 72 are effectively embedded or floating within the resilient material 76. Various alternative embodiments, achieving a similar technical benefit to that illustrated in FIG. 6, will now be described with reference to the schematic illustrations shown in FIG. 8.

Figure 8A:
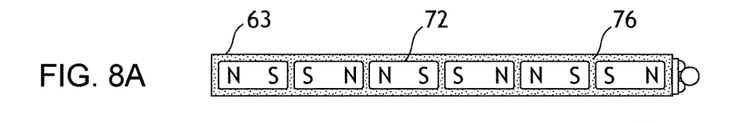
FIGS. 8A to 8L show various alternative embodiments of the first member shown in FIGS. 5A to 5C and 6.

For ease of comparison, FIG. 6 is repeated as FIG. 8A. In the embodiment illustrated in FIG. 8B, spacers 71 are arranged axially between the magnets 72, with each spacer 71 being in contact a magnet 72 on each side. There are no gaps present between the spacers 71 and the magnets 72, and therefore no resilient material 76 between the magnets 72. However, when considered as a stack (or group), there is a gap at each end of the stack (between the magnets 72 and the first and second ends 77, 79 of the member 63) that is filled with resilient material 76. The resilient material 76 at each end is sufficient to absorb thermal expansion of the magnets 72.

Figure 8B:
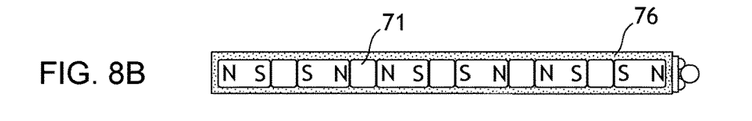
Figure 8C:
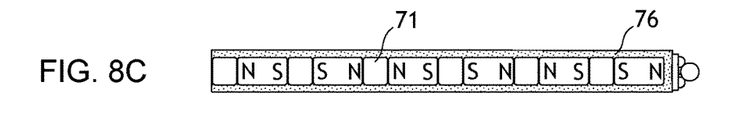

It is not even required that resilient material 76 at each end of the stack of magnets 72. FIG. 8C illustrates an embodiment in which resilient material 76 is only provided at one end, with spacers between each magnet 72 and also a spacer between the first magnet 72 and the first end 77 of the member 63. The resilient material 76 at the second end 79 is sufficient to absorb thermal expansion of the magnets 72.

For the resilient material 76, the present applicant has determined that a low-viscosity silicone gives good results. Silicones are polymers that include any inert, synthetic compound made up of repeating units of siloxane, which is a chain of alternating silicon atoms and oxygen atoms, frequently combined with carbon and/or hydrogen. The spacers 71 of FIGS. 8B and 8C are non-magnetic, for example formed of aluminium, and mechanically rigid. In one embodiment, the spacers 71 are half the length (in an axial direction) of the magnets 72.

The embodiment shown in FIG. 8C can be constructed by inserting magnets 72 and spacers 71 alternately into an open second end 79 of the first member 63, with the ever-lengthening stack of magnets 72 and spacers 71 being pushed further and further into the tube 78, towards the first end 77, as each new magnet 72 or spacer is inserted into the first end 79. The tube 78 could initially be open at both ends, or closed at one end and open at the other to allow the magnets 72 and spacers 71 to be inserted.

The magnets and spacers would typically be of a similar, but slightly smaller, cross section to the inner profile of the first member 63, to allow them to move from the second end 79 to the first end 77 without flipping around (particularly in view of the repelling magnetic force exerted by the adjacent magnet 72), though with a small gap in a radial direction to allow them to move freely.

All of the magnets and spacers are pushed together like this so they touch each other in an axial direction to form a stack extending the majority of the length of the tube 78, though leaving a small gap at the second end 79. Silicone is then injected into the tube 78, filling the radial gap mentioned above between the stack and the inner wall of the tube 78, as well as the axial gap at the second end 79.

The presence of a small radial gap, and hence a resilient material 76 in that radial gap, is not particularly advantageous in a metrology context, in that thermal expansion of the magnets 72 (and hence the tube 78) in a radial direction does not typically affect the metrology results. However, the presence of resilient material 76 in the radial gap is at least beneficial in preventing the magnets 72 from rattling around, and in doing so is beneficial mechanically. Not only is such rattling noisy (and disconcerting in a high-precision instrument), but the associated vibrations may also have a negative impact on the metrology. Therefore preventing such radial movement may also be beneficial to the metrology results, though not as significant or direct as the benefit derived from having a resilient material arranged to absorb thermal expansion and contraction in an axial direction.

Figure 8D:
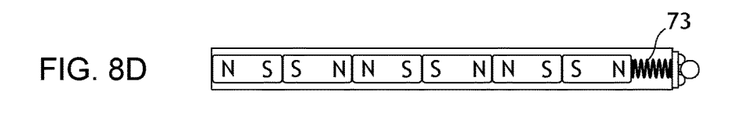

FIG. 8D illustrates schematically an embodiment in which a resilient member is provided in the form of a spring member 73 between the end-most magnet 72 and the second end 79 of the first member 63. Just like the resilient material 76 of FIGS. 8A to 8C, the spring member 73 of FIG. 8D acts to absorb at least some of any thermal expansion and contraction of the magnets 72 in an axial direction.

FIG. 8D also illustrates that it is not essential for resilient material 76 to surround the magnets 72 in a radial direction, since the embodiment of FIG. 8D does not have that feature. The air gap should ideally be small enough to prevent significant radial movement of the magnets 72, but not too small that thermal expansion of the magnets 72 in a radial direction will cause the magnets to expand into the tube 78. Whilst thermal expansion of the tube 78 in a radial direction will not directly affect the metrology, because it does not lead to a change in the length of the first member 63, if the magnets 72 push radially against the inner wall of the tube 78 then the frictional contact, combined with further thermal expansion of the magnets 72, may lead to axial expansion of the first member 63 (which would directly affect the metrology). However, if the friction between the magnets 72 and tube 78 is sufficiently low, to allow the magnets 72 to expand freely in an axial direction, then there need not be any radial gap at all; this applies to all the embodiments shown in FIG. 8.

Figure 8E:
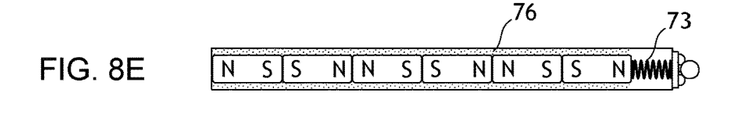

The embodiment illustrated schematically in FIG. 8E is similar to that of FIG. 8D, with the only difference being that resilient material 76 has been injected down the radial gaps to prevent the problem of radial movement (e.g. rattling) of the magnets 72.

Figure 8F:
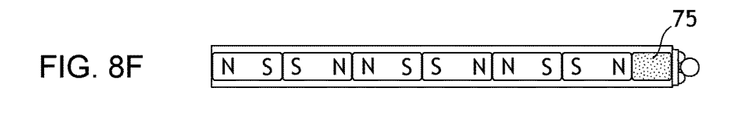

The embodiment illustrated schematically in FIG. 8F is similar to that of FIG. 8D, with the spring member 73 being replaced by a genericised resilient member 75, which could take any suitable form. For example, the resilient member 75 could take the form of a rubber spacer or block.

Figure 8G:
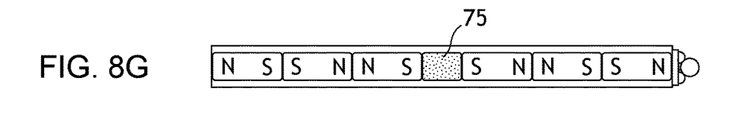
Figure 8H:
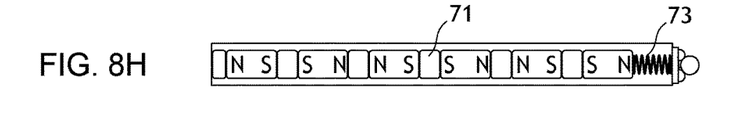
Figure 8I:
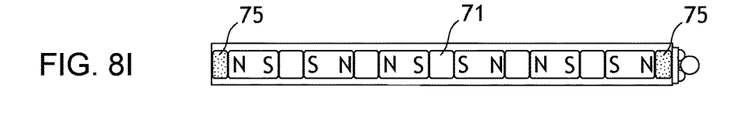
Figure 8J:
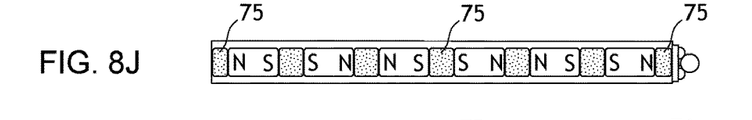
Figure 8K:
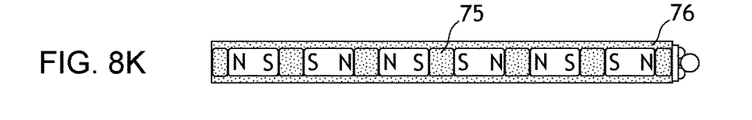

FIG. 8G illustrates that the resilient member 75 need not be located at either end of the stack of magnets 72, but could be located somewhere in the middle. FIG. 8H illustrates that the spring member 73 can be used in conjunction with the non-resilient spacers 71 introduced in FIG. 8B. FIG. 8I illustrates that a combination of resilient spacers 75 and non-resilient spacers 71 can be used, while FIG. 8J illustrates that resilient spacers 75 could be provided at each end of the stack as well as between each adjacent pair of magnets 72. FIG. 8K is a variant of FIG. 8J, with resilient material 76 filling the radial gaps.

Figure 8L:
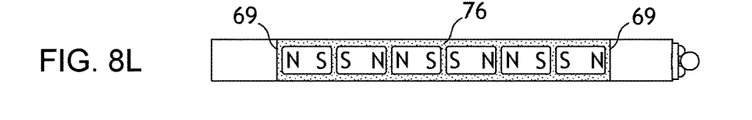

Finally, FIG. 8L illustrates that it is not necessary for the stack to extend from end to end of the tube 78. The axial arrangement of magnets 72 and spacers 71 is held in place within the tube 78 by two stops 69, which could be offset from the ends of the tube 78 by any suitable distance. In the illustration of FIG. 8L, both stops 69 are offset from respective ends 77, 79 of the tube 78, but one or both of the stops 69 could be coincident with the ends 77, 79. A stop 69 could form an end 77, 79 of the tube 78, for example as a cap. In the embodiments shown in FIGS. 8A to 8K, the stops 69 are provided at respective ends 77, 79 of the tube 78.

It should be apparent from FIG. 8 that there is a wide variety of ways in which an embodiment of the present invention can be implemented. The common feature is that the first member 63 comprises an axial arrangement of magnets 72 forming part of a linear motor 70 for extending and retracting the extendable leg assembly 60, and a resilient member 73, 75, 76 arranged to absorb at least some of any axial thermal expansion or contraction of the magnets 72 in use. In general, there can be considered to be an axial arrangement of elements, with the elements of the axial arrangement comprising at least the magnets 72 and the resilient member 75 (with the resilient member 75 representing any suitable resilient member including the spring 73 or the resilient material 76), and optionally elements like the non-magnetic spacers 71. The presence of a resilient member as part of the axial arrangement of elements results in at least some of any thermal expansion and contraction of the magnets being absorbed in use. The axial arrangement of elements may be provided between the two stops mentioned above, which may be the respective ends of the member.

It will be appreciated that the magnets need not be arranged as illustrated, in the order NS-SN-NS-SN-NS, and other arrangements are possible.

Figure 9:
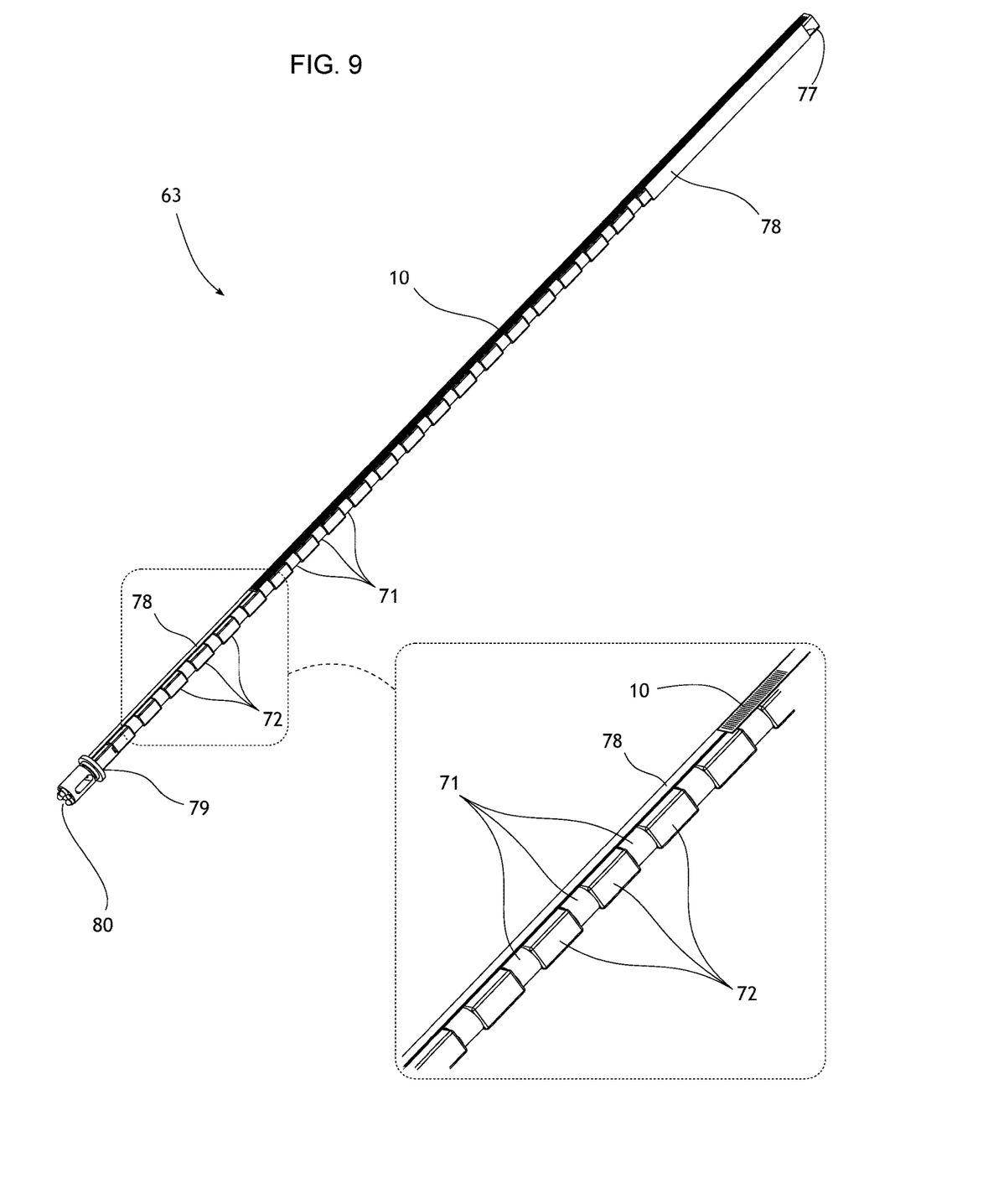
FIG. 9 provides a view showing more clearly how the magnets are arranged in an actual implementation of the invention.

Whilst FIGS. 5, 6 and 8 illustrate the first member 63 in a fairly schematic manner, FIG. 9 provides a more realistic (less schematic) view, to show more clearly how the magnets 72 are arranged in an actual implementation of the invention. In FIG. 9, the hollow tube 78 of the first member 63 is partially cut away, to reveal the magnets 72 and spacers 71 arranged alternately, just as depicted schematically in FIG. 8C, for example. The hollow tube 78 is of a generally square cross section. Similarly, the magnets 72 are of a generally square cross section to match that of the inside of the hollow tube 78, though smaller to allow for a small radial gap as described above. The magnets 72 are provided in this example with chamfered corners and edges, at least partly to ease their passage through the tube 78 when the first member 63 is being put together. The spacers 71 in this example of a generally circular cross section. Also illustrated is the encoder scale 10 affixed to an outer side of the tube 78.

It will be appreciated that, although the magnets are illustrated in the drawings as being separate from one another, i.e. formed as separate elements, it is possible that a single block of magnetic material is magnetised in a way so as to form a plurality of magnets within the same block of material. Accordingly, a plurality of magnets is not to be interpreted as being limited to a plurality of individual and separate magnet elements.

Just as thermal expansion of the magnets 72 leads in turn to an increase in the length of the first member 63, the present applicant has also appreciated that there may be thermal expansion of the material forming the tube 78 of the first member 63 itself, and indeed that of the second member 65. Accordingly, the present applicant has found it to be beneficial to form the first and/or second members 63, 65 from a composite material such as carbon fibre, which has a very low coefficient of thermal expansion, as well as having a high specific stiffness (stiffness divided by density) and high specific strength (strength divided by density).

The present applicant has found the use of a linear motor (or linear actuator) 70, as described above, to be very convenient and effective for extending and retracting the extendible leg assemblies 60 of a non-Cartesian coordinate positioning machine. As is apparent from FIG. 2, the weight of the lower platform 40 and probe 14 is supported by the extendible leg assemblies 60, which in turn are each formed from first and second telescoping members 63 and 65. As described above, the linear motor 70 is provided to move the members 63 and 65 relative to one another. Not only that, but the linear motor 70 would also be required to prevent the two first and second members 63, 65 from pulling apart, for example under the action of gravity acting on the lower platform 40 and probe 14. Therefore, in such a situation the linear motor 70 would typically also act as a sort of brake, applying a force equal and opposite to the force of gravity, in order to keep the platform 40 stationary when the system is "at rest".

The present applicant has appreciated that this presents a problem in a metrology context that is related to the problem described above, which is heat generation from the linear motor 70. This heat has a negative impact on metrology because it leads to thermal expansion and contraction of components in the metrology loop, leading to inaccurate measurement results. The present applicant has solved this problem, which is particular to the combination of a non-Cartesian coordinate positioning machine and the use of linear motors for leg extension, by introducing a counterbalance arrangement 90, as illustrated in FIGS. 10 to 12.

The counterbalance arrangement 90 acts to support at least some of the weight of the lower (moving) platform 40 and any components attached thereto, thereby reducing the burden on (taking the strain off) the linear motor 70. Because the weight is no longer supported by the linear motors 70, the current to the coils 74 can be much reduced, and in turn the heat generated in the coils is also reduced. The combination of a non-Cartesian coordinate positioning machine, linear motors for leg extension, and a counterbalance arrangement to reduce the strain on the linear motors has not been previously proposed.

It will be appreciated that the counterbalance arrangement 90 is not required to provide support that is precisely equal as the weight carried by the linear motors. That is the ideal situation, but in practice there is a benefit achieved by balancing at least some of that weight, since the current to the coils 74 is reduced. In view of this, the design of the counterbalance arrangement 90 is not critical, since it does not need to provide exact balance, which would be particularly difficult to achieve across the entire working volume of the machine 100. The skilled person would therefore have no difficulty in providing a suitable counterbalance arrangement, based on known such counterbalance arrangements.

Figure 10:
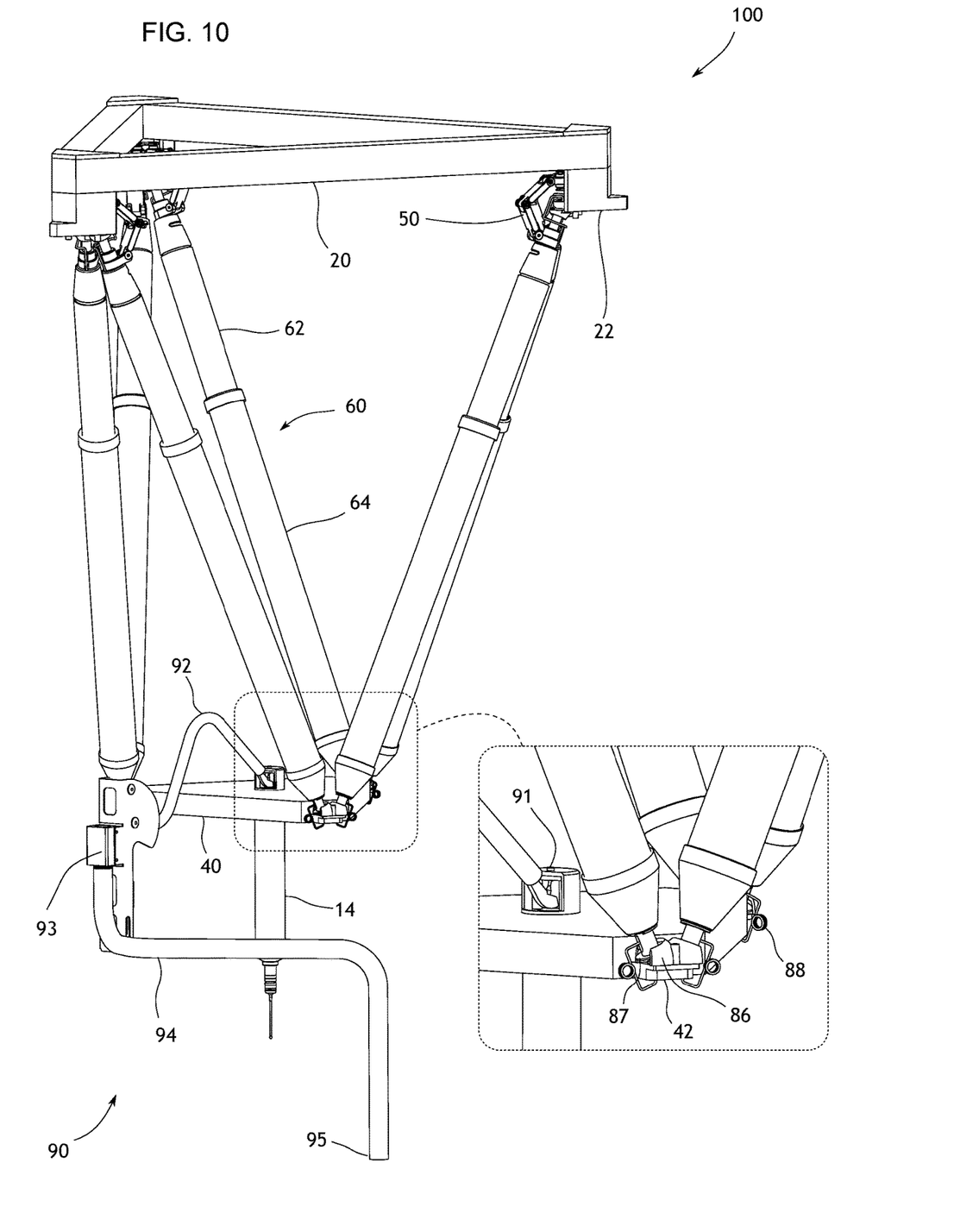
FIG. 10 is an overall view of a non-Cartesian coordinate positioning machine according to another embodiment of the present invention, including a linear motor for driving the struts, and a counterbalance arrangement.
Figure 11:
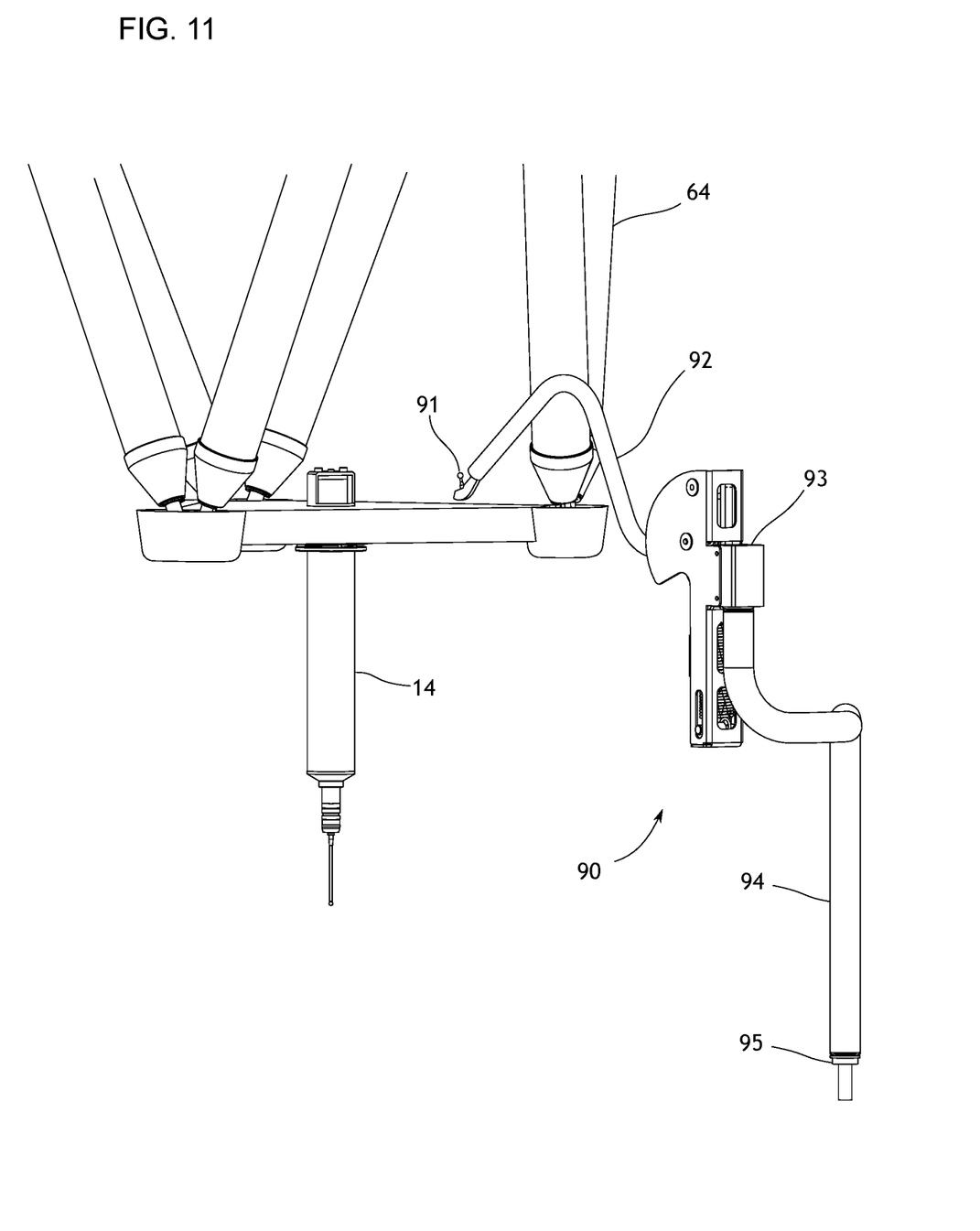
FIG. 11 shows a further view of the non-Cartesian coordinate positioning machine of FIG. 10.
Figure 12:
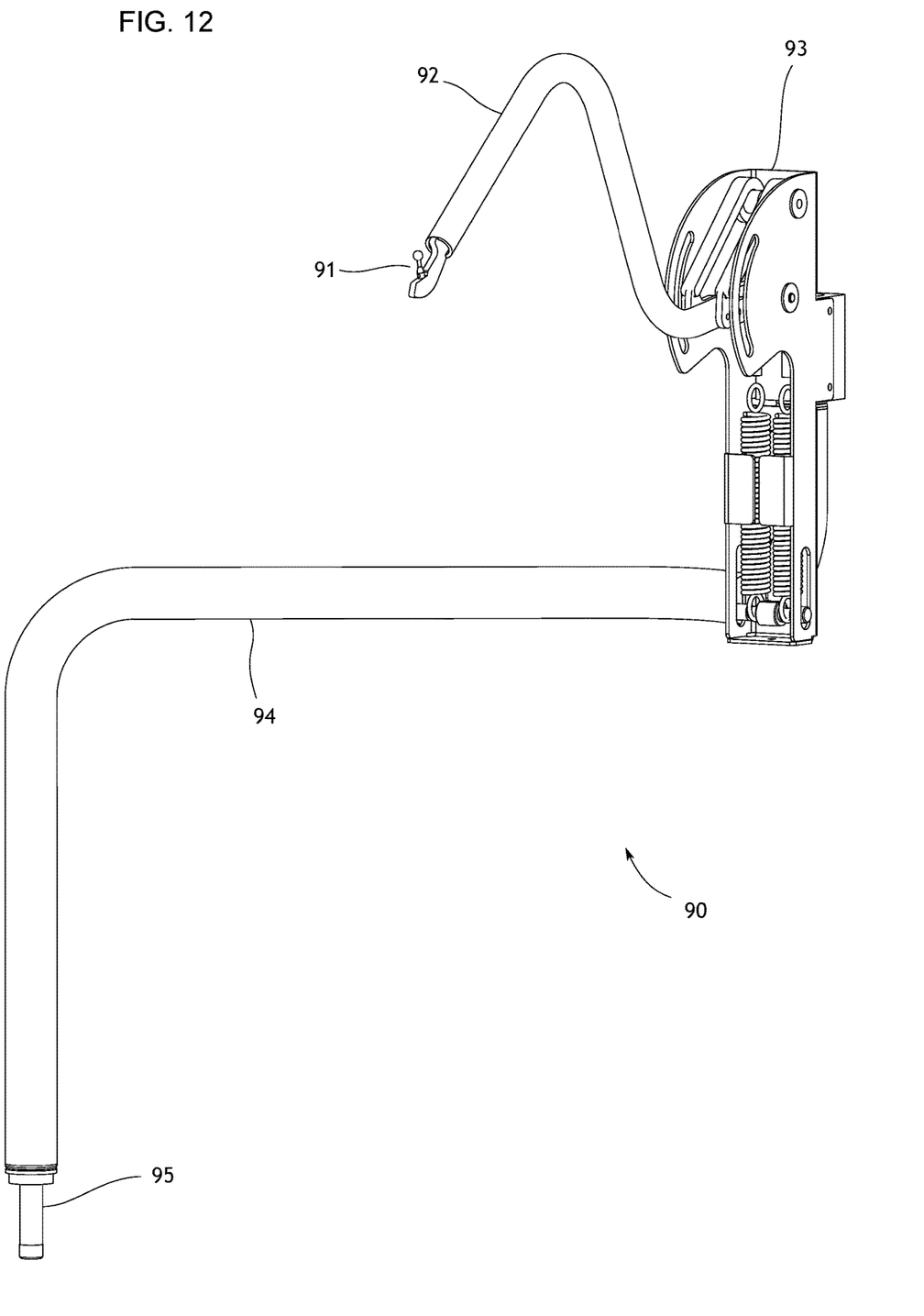
FIG. 12 shows a further view of the non-Cartesian coordinate positioning machine of FIG. 10.

By way of illustration, one example design of counterbalance arrangement 90 is shown in FIGS. 10 to 12, though this is by no means to be considered restrictive on the scope of the invention. The counterbalance arrangement 90 of this example comprises first and second arms 92, 94 connected to each other via joint 93. The first arm 92 is connected to the top of the lower platform 40 via joint 92, and the second arm 94 is connected to a fixed part (not shown) of the machine 100 via joint 95 (most clearly illustrated in FIG. 11). Detail of the joint 93 is shown in FIG. 12.

Also illustrated in FIG. 10 (most clearly in the expanded sub-view) are two additional beneficial features of this embodiment, which can be used independently of the counterbalance arrangement 90. Firstly, a retaining spring 88 is provided for each ball joint 80, connected on one side to the support block 42 of the lower platform 40 and on the other side to a lower end of the extendable leg assembly 60. The retaining spring 88 biases the three balls 84 on the end of the elongate member 66 (see the expanded sub-view of FIG. 3) into contact with the ball 82 on the support block 42, and helps to prevent the extendable leg assembly 60 from lifting off and becoming detached from the support block 42 during use (which may happen accidentally by extreme and unintended movements of the lower platform 40). This retaining element therefore acts to bias the extendable leg assembly 60 into engagement with the support for the extendable leg assembly 60.

Secondly, a retaining hood 86 is provided on the support block 42, which at least partly encloses (traps) a retaining flange 87 provided at a lower end of the extendable leg assembly 60. When an attempt is made to lift the extendable leg assembly 60 directly away from the support block 42, since the retaining flange 87 is trapped within the hood 86, complete disengagement of the extendable leg assembly 60 from the support block 42 is prevented. This again helps to avoid the extendable leg assembly 60 lifting off and becoming detached from the support block 42 inadvertently during operation. However, the retaining hood 86 is open to one side, and there is a small clearance above the retaining flange 87 when engaged, thus allowing the retaining flange 87 (and hence the extendable leg assembly 60) to be disengaged by a slight lift followed by a sideways movement. More generally, this retaining feature comprises a retaining feature on the support which cooperates with a retaining feature on the extendable leg assembly to prevent complete axial disengagement whilst allowing disengagement by a small axial separation followed by a substantially radial movement.

The combination of the two retaining features described above is particularly beneficial, since the retaining hood and flange 86, 87 prevent gross disengagement while the retaining spring 88 helps to prevent inadvertent separation of the flange 87 from the retaining hood 86 by biasing the balls 82, 84 into engagement (and thereby preventing the radial movement required to remove the flange 87 from the hood 86.

Another beneficial feature of the machine 100 illustrated in at least FIGS. 2 and 10 is that the upper platform 20, otherwise referred as the "top frame" is removable (detachable) from the machine 100. In known non-Cartesian machines, the top frame would typically form an integral part of the machine, and would not be removable. In the illustrated embodiment, the upper platform 20 includes six balls, equivalent to those marked as 82 in FIG. 3, and with the upper platform 20 being removable this allows the platform 20 (including balls) to be measured with a CMM for calibration purposes, for example to measure the positions and/or separation of the balls, and then placed back in the machine 100.

Although the non-Cartesian coordinate positioning machine illustrated in the appended drawings has six extendable leg assemblies, a non-Cartesian coordinate positioning machine embodying the present invention is of course not limited to having six extendable leg assemblies, with the number and configuration of extendable leg assemblies being determined by the application concerned.

Although an embodiment of the invention has been described mainly in the context of a coordinate measuring machine and a comparator, the invention is applicable more generally to any type of coordinate positioning machine, such as scanning machines, machine tools, robots, positioning devices (e.g. for optical components), prototype manufacturing machines and various other uses.

The invention claimed is:

1. A non-Cartesian coordinate positioning machine comprising first and second platforms and a plurality of extendable leg assemblies arranged between the first and second platforms for positioning the first and second platforms relative to one other by extending and retracting the extendable leg assemblies, wherein each extendable leg assembly comprises a linear motor having an axial arrangement of magnets for extending and retracting the extendable leg assembly and at least one resilient member for absorbing at least some of any axial thermal expansion or contraction of the magnets that would otherwise affect a length associated with the extendable leg assembly.

2. A machine as claimed in claim 1, wherein the at least one resilient member comprises a resilient material.

3. A machine as claimed in claim 1, comprising a counterbalance arrangement for supporting at least some of a weight that would otherwise be supported by operation of the linear motors.

4. A machine as claimed in claim 1, wherein each extendable leg assembly comprises a metrology component, such as an encoder scale, for measuring a length associated with the extendable leg assembly.

5. A machine as claimed in claim 4, wherein a surface to which the metrology component is affixed is at least partly formed from a composite material, such as a graphite composite material, for example a carbon fibre material.

6. A machine as claimed in claim 4, wherein each extendable leg assembly comprises a load-bearing structure and a metrology structure, with the linear motor forming part of the load-bearing structure, with the metrology component forming part of the metrology structure, and with the metrology structure being separate and/or mechanically isolated from the load-bearing structure.

7. A machine as claimed in claim 1, wherein a measurement probe is supported on the first or second platform, and/or wherein the machine is at least one of: (a) a hexapod coordinate positioning machine; (b) a coordinate measuring machine; (c) a comparator; and (d) a machine tool.

8. A non-Cartesian coordinate positioning machine comprising first and second platforms and a plurality of extendable leg assemblies arranged between the first and second platforms for positioning the first and second platforms relative to one other by extending and retracting the extendable leg assemblies, wherein each extendable leg assembly comprises a metrology component for measuring a length associated with the extendable leg assembly, and wherein a surface to which the metrology component is affixed is at least partly formed from a composite material.

9. A machine as claimed in claim 8, wherein the composite material comprises a graphite composite material.

10. A machine as claimed in claim 9, wherein the composite material comprises a carbon fibre material.

11. A machine as claimed in claim 8, wherein the metrology component comprises an encoder scale.

12. A machine as claimed in claim 8, wherein each extendable leg assembly comprises a linear motor for extending and retracting the extendable leg assembly.

13. A machine as claimed in claim 12, wherein each extendable leg assembly comprises a load-bearing structure and a metrology structure, with the linear motor forming part of the load-bearing structure, with the metrology component forming part of the metrology structure, and with the metrology structure being separate and/or mechanically isolated from the load-bearing structure.

14. A machine as claimed in claim 8, wherein a measurement probe is supported on the first or second platform, and/or wherein the machine is at least one of: (a) a hexapod coordinate positioning machine; (b) a coordinate measuring machine; (c) a comparator; and (d) a machine tool.

15. A non-Cartesian coordinate positioning machine comprising first and second platforms and a plurality of extendable leg assemblies arranged between the first and second platforms for positioning the first and second platforms relative to one other by extending and retracting the extendable leg assemblies, wherein each extendable leg assembly comprises a linear motor for extending and retracting the extendable leg assembly, and wherein the machine further comprises a counterbalance arrangement for supporting at least some of the weight that would otherwise be supported by operation of the linear motors of the extendable leg assemblies.

16. A machine as claimed in claim 15, wherein the linear motor of each extendable leg assembly comprises an axial arrangement of magnets for extending and retracting the extendable leg assembly.

17. A machine as claimed in claim 15, wherein each extendable leg assembly comprises first and second members which move relative to one another when the extendable leg assembly changes length, the first member comprising an axial arrangement of magnets forming a first part of the linear motor and the second member comprising a coil forming a second part of the linear motor.

18. A machine as claimed in claim 15, wherein each extendable leg assembly comprises a metrology component for measuring a length associated with the extendable leg assembly.

19. A machine as claimed in claim 18, wherein each extendable leg assembly comprises a load-bearing structure and a metrology structure, with the linear motor forming part of the load-bearing structure, with the metrology component forming part of the metrology structure, and with the metrology structure being separate and/or mechanically isolated from the load-bearing structure.

20. A machine as claimed in claim 15, wherein a measurement probe is supported on the first or second platform, and/or wherein the machine is at least one of: (a) a hexapod coordinate positioning machine; (b) a coordinate measuring machine; (c) a comparator; and (d) a machine tool.

* * * * *